(12) United States Patent
Wooten et al.

(10) Patent No.: US 9,225,530 B2
(45) Date of Patent: Dec. 29, 2015

(54) SECURE CRYPTO-PROCESSOR CERTIFICATION

(71) Applicant: Microsoft Corporation, Redmond, WA (US)

(72) Inventors: David Rudolph Wooten, Redmond, WA (US); Dennis James Mattoon, Redmond, WA (US); Paul England, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/158,210

(22) Filed: Jan. 17, 2014

(65) Prior Publication Data

US 2015/0113266 A1 Apr. 23, 2015

Related U.S. Application Data

(60) Provisional application No. 61/893,484, filed on Oct. 21, 2013.

(51) Int. Cl.
H04L 29/06 (2006.01)
H04L 9/32 (2006.01)

(52) U.S. Cl.
CPC ............ *H04L 9/3268* (2013.01); *H04L 9/3234* (2013.01)

(58) Field of Classification Search
CPC ........... G06F 21/64; G06F 21/57; H04L 9/32; H04L 9/3263
See application file for complete search history.

(56) References Cited

U.S. PATENT DOCUMENTS

| 2004/0025036 A1* | 2/2004 | Balard et al. ................. 713/189 |
| 2014/0089660 A1* | 3/2014 | Sarangshar et al. .......... 713/156 |

* cited by examiner

*Primary Examiner* — Izunna Okeke
(74) *Attorney, Agent, or Firm* — Alin Corie; Kate Drakos; Micky Minhas (57) ABSTRACT

The subject disclosure is directed towards certifying cryptographic data for a crypto-processor outside of a controlled environment. The crypto-processor and a certifying entity maintain shared secret data for the purpose of verifying security of cryptographic key generation by the crypto-processor's firmware. In order to certify new cryptographic keys, the crypto-processor uses the shared secret data to verify the crypto-processor's firmware/hardware to the certifying entity. By protecting the shared secret data from exposure to compromised firmware, the shared secret data may be used to compute another secret conveying to the certifying entity whether the firmware can be trusted or not.

19 Claims, 8 Drawing Sheets

SECURE CRYPTO-PROCESSOR CERTIFICATION

CROSS-REFERENCE TO A RELATED APPLICATION

The present application claims priority to U.S. Provisional Patent Application Ser. No. 61/893,484, filed Oct. 21, 2013.

BACKGROUND

Various technologies implement access control and/or user authentication protocols involving one or more secure devices (e.g., security chips, smartcards and/or the like). These devices are configured to execute certain cryptographic operations, including encryption, decryption and cryptographic key generation. Occasionally, data enabling the cryptographic functions needs to be upgraded and/or replaced in order to mitigate or correct vulnerabilities. Such data includes code, including firmware, and other cryptographic data, including public/private encryption keys. Certifying entities issue certificates verifying at least a portion of this data to user applications.

To illustrate one example, computing systems that incorporate a suitable secure device can create cryptographic keys and then, encrypt those keys such that only the secure device itself is capable of decrypting them. This process, which can be referred to as wrapping or binding a key, protects the key from unwanted disclosure. Each secure device maintains, in secure memory, one or more such cryptographic keys. However, if a security vulnerability exists on the secure device, the firmware most likely is defective and due for replacement. Updating the firmware resolves the vulnerability but often results in the generation of new cryptographic keys. Because these keys are generated in an uncontrolled environment where the crypto-processor remains vulnerable to misuse, certificates for these new keys cannot be issued outside of a controlled environment where the keys are secure from exposure. Without certification, distinguishing between a compromised device with old exploitable firmware and a device with new updated firmware that does not contain the exploit is rendered extremely difficult.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards certifying a crypto-processor outside of a controlled environment by verifying that crypto-processor's identity. In one aspect, a certification process involves a certifying entity configured to verify the crypto-processor's hardware/firmware by auditing the crypto-processor's generation of new cryptographic data. In order to receive certificates for the new cryptographic data without providing the certifying entity with access to the crypto-processor, the certification process enables the crypto-processor to prove the firmware's validity to the certifying entity.

In one aspect, each environment used to perform such certification is considered uncontrolled because electro-mechanical control over the crypto-processor is not maintained by a manufacturer or another trusted entity. When hardware/firmware within the crypto-processor the new cryptographic data generates and prepares to use that data for secure data operations, the crypto-processor uses the trusted application secret to negotiate with the certifying entity over the issuance of certificates proving validity of the new cryptographic data. In one aspect, the trusted application secret is computed from shared secret data for verifying the crypto-processor's firmware and/or hardware.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a secure crypto-processor configured to use trusted application secret data to facilitate a certification process on cryptographic data while protecting that data and other data from exposure to entities in an uncontrolled environment. Hence, the secure crypto-processor does not have to be returned to a manufacturer-controlled environment where electrical control over the crypto-processor is assured in order to obtain certificates for cryptographic keys. In uncontrolled environments, such as the environments described herein, the secure crypto-processor obtains certificates for the cryptographic keys after verifying the security of cryptographic key generation by that crypto-processor's firmware and/or hardware.

The crypto-processor's manufacturer generally maintains a controlled environment where values of the shared secret data are stored in a secure data repository. To provide cryptographic data certification outside of the controlled environment, the manufacturer may grant the certifying entity access to at least some of the shared secret data. Such access enables the certifying entity to authenticate the crypto-processor's firmware and/or hardware and issue certificates for cryptographic key generators and/or cryptographic keys. When the crypto-processor requests certification, the certifying entity may manage the certification process through session-based protocols as described herein.

According to one example implementation, the shared secret data includes a shared secret that is established between the crypto-processor and the manufacturer who provides the shared secret to the certifying entity. Some embodiments of the secure crypto-processor do not store the shared secret and, during a boot sequence, compute the shared secret from data corresponding to hardware within the crypto-processor, such as fuse data. The fuse data may include at least some immutable data, which ensures that the computed shared secret can be trusted and verifiable. In order to secure the shared secret from exposure, an example embodiment of the crypto-processor generates trusted application secret data from the shared secret, and disables access to or securely deletes the shared secret. Since this is performed before running firmware, if the firmware were compromised, the shared secret cannot be re-computed in any practical manner. Hence, the trusted application secret data also cannot be duplicated and then, misappropriated by the compromised firmware to perform malicious activities. The certifying entity relies upon the trusted application secret data to re-certify/verify the crypto-processor's hardware and firmware combination as valid.

Using a stored copy of the shared secret and firmware data, the certifying entity computes a separate version of the trusted application secret data for verifying the firmware's capability of generating a secure cryptographic key generator. According to one example implementation, based upon the separate trusted application secret data, the certifying entity may generate a session secret (e.g., a symmetric key) and a hash-based message authentication code (HMAC) value, which when compared to a corresponding HMAC computed by the crypto-processor, enables execution a command or request from the certifying entity to be verified as successful. If the HMAC values do not match, the cryptographic data cannot be verified as secure. Each HMAC value generally refers to a form of symmetric signature over data, such as the trusted application secret data, for verifying that the data was not modified and originated from device with access to a key value, such as the session secret.

When the firmware on the crypto-processor changes, the trusted application secret data changes and therefore, any derived session secret (e.g., keys) also changes in a predictable manner. After the crypto-processor's firmware is updated, the certifying entity and the crypto-processor may negotiate certification by engaging in a session using the changed session secret derived from the modified trusted application secret data. The certifying entity instructs the crypto-processor to change a cryptographic key generator (e.g., a primary cryptographic key generator) and generate a new cryptographic key (e.g., a primary key). Because this process is monitored by the certifying entity, it can be assured that the new cryptographic key is generated after the cryptographic key generator changed and/or belongs to the crypto-processor with specific firmware, rendering the session a cryptographic equivalent of a controlled environment. For example, if the session secret computed by the certifying entity does not match the changed session secret at the crypto-processor, the crypto-processor cannot compute a valid HMAC value that verifies the new cryptographic generator and the session terminates without certification. Another particular advantage is that the certifying entity does not know the cryptographic key generator.

The trusted application secret is configured to change in a predictable manner whenever the firmware in the crypto-processor changes. A compromise in the firmware results in a different trusted application secret since data (e.g., measurements) corresponding to the firmware also changed. Secure and uncompromised firmware does not expose the shared secret and therefore, a certifying entity can assume that a trusted application secret computed from a specific shared secret represents a secure computing device and/or crypto-processor running secure and uncompromised firmware.

The cryptographic keys created by the computing device are based on a cryptographic key generator that is neither stored nor exported outside of the crypto-processor. If the cryptographic key generator was used when the crypto-processor was running compromised firmware, the cryptographic keys also may be compromised. When the cryptographic key generator changes, in a deterministic manner, the compromised keys cannot be recertified because the crypto-processor will no longer be able to create them. After verifying that the firmware changed the cryptographic key generator, for example, in accordance with a key hierarchy, new cryptographic keys may be used for performing secure data operations on encrypted data.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and cryptography in general.

Figure 1:
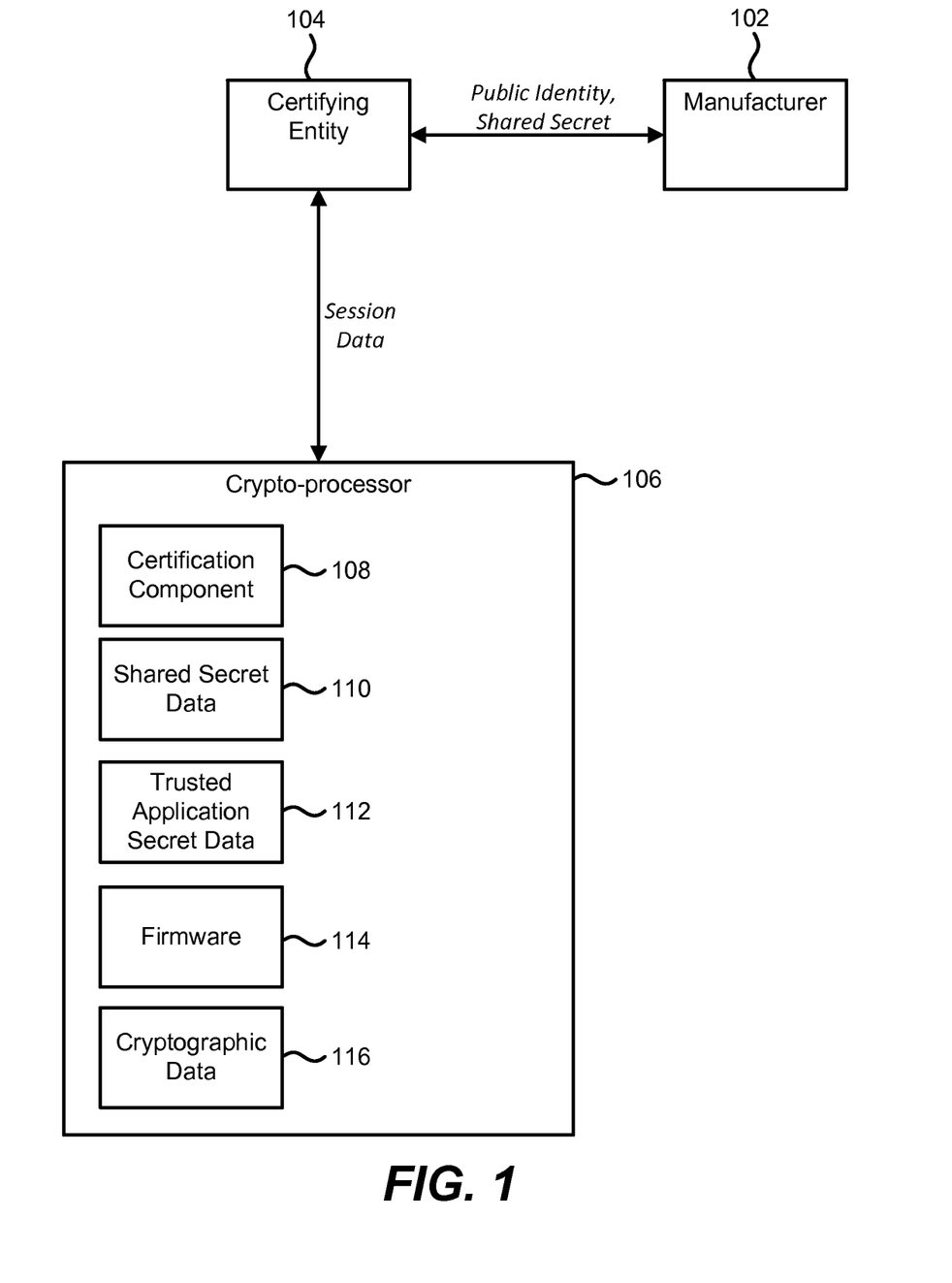
FIG. 1 is a block diagram illustrating an example system for secure crypto-processor certification according to one or more example implementations.

FIG. 1 is a block diagram illustrating an example system for secure crypto-processor certification according to one or more example implementations. Example components of the example system include a manufacturer 102, a certifying entity 104 and a crypto-processor 106. The manufacturer 102 and the certifying entity 104 may operate independently or under a single organization as co-entities configured to provide crypto-processor certification.

The manufacturer 102 generally represents a controlled environment or facility in which crypto-processors are fabricated and provisioned for use by the public. Such an environment may be considered controlled if electrical, mechanical and other components are substantially secure from misappropriation. In one example embodiment, the manufacturer 102 records various data associated with each crypto-processor, including vendor data, firmware data (e.g., firmware measurements, version number and/or the like) and/or fuse data. Some data may be shared with the crypto-processor 106, such as key generators, authorization values, shared secrets and other values, including one or more immutable values. One example immutable value includes device-specific data that cannot be modified by any component and/or exported from the crypto-processor 106.

To provide cryptographic data certification in an uncontrolled environment, such as an execution environment for the crypto-processor 106, the manufacturer 102 may grant the certifying entity 104 access to at least some of the shared data mentioned above, including shared secret(s) between the manufacturer 102 and the crypto-processor 106. When the crypto-processor 106 requests certification, for example, after a firmware upgrade, the certifying entity 104 may manage a certification process to determine whether to issue a certificate proving validity of cryptographic data, including one or more cryptographic keys.

The crypto-processor 106 includes technology directed to providing hardware-based, security-related functionality. Examples of the crypto-processor 106 include a Trusted Platform Module (TPM), a Hardware Security Module (HSM), a security chip and/or the like. The crypto-processor 106 typically includes one or more microcontrollers or microprocessors designed to provide security-related functions, primarily involving encryption keys, and secure data computations. The crypto-processor 106 includes multiple hardware/software security mechanisms providing tamper resistance to malicious software. At least some example embodiments of the crypto-processor 106 include a microchip configured for installation on a computing device's motherboard and further configured for communication with the remainder of the computing device via a hardware bus. Alternatively, the crypto-processor 106 may be a built-in chip (e.g., System-On-Chip (SoC)) in the computing device's motherboard.

As another alternative mechanism, the crypto-processor 106 enables secure data operations when attached to the computing device as an external device. The external device may be removed from the computing device and the crypto-processor 106 may be inserted into another computing device, such as a desktop computer. Furthermore, the crypto-processor 106 may be one of a configuration of multiple crypto-processors arranged within the external device.

The computing device uses the crypto-processor 106 to create and encrypt cryptographic keys to ensure that these keys can only be decrypted by the crypto-processor 106. The crypto-processor 106 stores the cryptographic keys in memory, including a primary key sometimes known as a master wrapping key or a storage root key. A private portion of the primary key, which may be known as an endorsement key, is created in the crypto-processor 106 but is never exposed to any other component, software, process, or user. The crypto-processor 106 communicates a public portion of the primary key to the certifying entity for generating certificates.

As described herein, these certificates may be installed on/issued to the computing device operating the crypto-processor 106. For example, after the computing device is provisioned, an asymmetric private key, whose validity is mathematically proven by a certificate, is bound to the crypto-processor 106 and cannot be exported from the crypto-processor 106. Some example implementations use smart cards as an alternative to or in combination with the crypto-processor 106. These example implementations may store the asymmetric private key and immutable data in non-exportable secure memory.

The crypto-processor 106 may include one or more components that form at least a portion of a trusted computing architecture comprising different execution environments. An execution environment for the crypto-processor 106 may be isolated from another execution environment of an operating system (OS) running within the computing device. In the other execution environment, the computing device may store encrypted data within a hard disk and use the crypto-processor 106 to execute secure computations on such data. The crypto-processor 106, for example, retrieves encrypted database records from the hard disk, decrypts these records in secure memory, performs secure computations on these records, and returns encrypted computation results and/or modified encrypted database records. Because the database records cannot be accessed by the other execution environment when stored in the crypto-processor 106, these records may be encrypted/decrypted securely.

When the crypto-processor 106 commences a boot sequence via a certification component 108, an initial piece of code is executed resulting in the processing of statistically unique data and computing of shared secret data 110 between the crypto-processor 106 and the certifying entity 104. The shared secret data 110 is not stored in the crypto-processor 106 and thus, is inaccessible during the boot sequence according to one example implementation. The shared secret data 110 generally refers to private identity data for hardware within the crypto-processor 106. Before disabling access to the shared secret data 110, the certification component 108 computes trusted application secret data 112 using the shared secret data 110 and data corresponding to firmware 114. Hence, the trusted application secret data 112 may identify a particular combination of the hardware corresponding to the crypto-processor 106 and the firmware 114 running within the crypto-processor 106.

The statistically unique data mentioned above may be hereinafter referred to as fuse data. Although one example implementation often stores such data in programmable fuses, the fuse data may be accessible via other, non-volatile storage/memory. After the fuse data is read by the certification component 108, access to the fuse data is disabled to prevent that data from being read again during a current boot sequence. Without access to the fuse data, even if the firmware 114 became compromised, the firmware 114 cannot use the fuse data to misappropriate the shared secret data 110 and purport to be secure firmware capable of generating secure cryptographic keys. The certification component 108 uses a one-way function (e.g., a hash function) in combination with other information to create a public identity (ID) value. The certification component 108 may use the same one-way function to create the shared secret data 110 that is established between the crypto-processor 106 and the certifying entity 104. The shared secret data 110 may include a shared secret value. If necessary, the certification component 108 may use the one-way function to create other cryptographic seeds/keys for other applications.

According to one example implementation, executing the firmware 114 prepares the crypto-processor 106 to begin using cryptographic data 116 for data encryption/decryption and cryptographic key generation. According to one example implementation, the cryptographic data 116 includes a cryptographic key generator associated with the firmware 114 and/or any cryptographic key produced from the cryptographic key generator. The cryptographic key generator may include an asymmetric public/private key generator or seed value. The cryptographic key generator may correspond to a specific version of the firmware 114 and, through a session-based protocol, the cryptographic key generator may be changed to facilitate a certification process of the firmware 114. A session generally constitutes a mechanism through which the certifying entity 104 and the crypto-processor 106 negotiate certification of the cryptographic key generator. Each may prove knowledge of the shared secret data 110 using the above the trusted application secret data 112.

When the necessary cryptographic keys are generated, the certification component 108 may securely delete or completely/substantially disable access to the shared secret data 110 to prevent unwanted disclosure of that data. If the firmware 114 engages in malicious behavior, the shared secret data 110 cannot be accessed and furthermore, a process for computing the shared secret data 110 cannot be replicated. Even when the crypto-processor 106 loads compromised code from within the firmware 114 and provides that code with access to the trusted application secret data 112 and/or the associated firmware measurement, the compromised code cannot recreate the shared secret data 110 from the trusted application secret data 112 and/or the associated firmware measurement. Hence, once deleted, the shared secret data 110 cannot be re-computed and the compromised code within the firmware 114 cannot compute a fraudulent trusted application secret to replace the trusted application secret data 112 during the certification process with the certifying entity 102.

Software applications may continue to access the public identity of the crypto-processor 106. The shared secret data 110 is combined with a measurement of the firmware 114 to produce the trusted application secret data 112. Code corresponding to the firmware 114 may be measured and hashed with the shared secret value to produce the trusted application secret data 112, which remains the same as long as the firmware 114 and the hardware remain unchanged. Hence, when the firmware 114 is updated, the trusted application secret changes because the associated firmware measurement changed. When the certification component 108 boots up the crypto-processor 106, the crypto-processor 106 computes an updated copy of the trusted application secret data 112 and deletes the shared secret data 110.

As described herein, the certifying entity 104 and the crypto-processor 106 may be configured to conduct sessions with each other. One example session, which may be referred to as an audit session, provides the certifying entity 104 with verification that a new cryptographic key is secure and uncompromised. If the new cryptographic key was generated after the cryptographic key generator changed, the audit session also facilitates verification that the crypto-processor 106 is capable of generating secure cryptographic keys. The audit session includes processing a digest of request/response parameters to provide proof that a certain sequence of events occurred in the crypto-processor 106. Once verified, the certifying entity 104 may issue one or multiple certificates allowing the crypto-processor 106 to begin using the cryptographic data 116 for secure data operations.

During the above mentioned session, the certifying entity uses the public identity value and the firmware version number to access a secure data store and retrieve the shared secret associated with the crypto-processor 106 and firmware measurements associated with the firmware version number. After computing a copy of a trusted application secret, the certifying entity computes a session secret and/or an HMAC value verifying the session secret.

If the certifying entity 104 uses a correct shared secret to compute a copy of the session secret, the certifying entity 104 may verify that the crypto-processor 106 generated the cryptographic key after changing the cryptographic key generator by comparing an HMAC value with another HMAC value computed from the crypto-processor's copy of the session secret. If these HMAC values match, the operating system instructs the crypto-processor to generate the cryptographic key, as instructed by the certifying entity, and returns an acknowledgment of the new cryptographic key. If the HMAC values do not match, the crypto-processor instructs the operating system not to return any information to the certifying entity.

Figure 2:
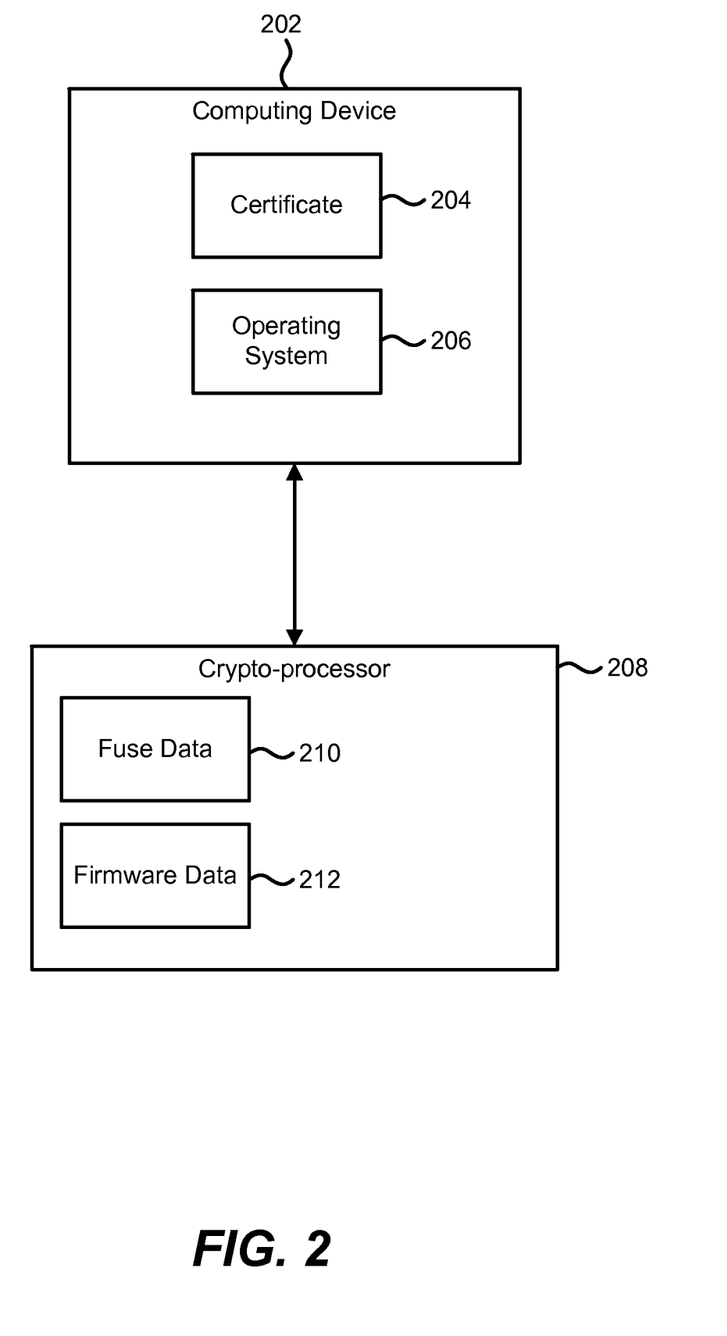
FIG. 2 is a block diagram illustrating an example environment in which one or more components perform cryptographic data certification according to one or more example implementations.

FIG. 2 is a block diagram illustrating an example environment in which one or more components perform cryptographic data certification according to one or more example implementations. The example environment includes a computing device 202 being managed by various components, such as operating system components. Example embodiments of the computing device 202 include a laptop computer, desktop computer, server computer and/or the like. The computing device 202 may obtain a certificate 204 proving validity/possession of various cryptographic data generated by a crypto-processor 208. An operating system 206 may be configured to use the cryptographic data to retrieve and/or modify crypto-processor protected application data (e.g., encrypted data).

The crypto-processor 208 includes a device (e.g., a Trusted Platform Module (TPM), a hardware security module (HSM) and/or the like) that may generate, store, and manage asymmetric encryption (e.g., RSA) keys; one example embodiment includes an external or removable device that couples with the computing device 202 via a port while another example embodiment includes a microchip embedded into the computing device 202 during manufacture. An alternative embodiment includes an expansion card configured for installation onto the computing device 202. Another example embodiment of the device may be coupled to a network via a communication protocol (e.g., TCP/IP). Such a device may be employed to secure browsing sessions for an e-commerce web server or to provide encryption services for a high-availability cluster.

The operating system 206 running within the computing device 202 may be configured to interact with the crypto-processor 208, for example, by using the cryptographic data, including cryptographic keys, to verify the computing device 202 to other entities, authenticate software applications, encrypt/decrypt/sign application data, encrypt password-protected login procedures and/or the like. The cryptographic keys also may be used to exchange data with another computing device, for example, if both devices share a same key-wrapping key. If the crypto-processor 208 is removable, the cryptographic keys may be deleted prior to being decoupled from the computing device 202.

One or more example embodiments of the crypto-processor 208 use shared secret data to certify the cryptographic keys. As described herein, the shared secret data allows the crypto-processor to verify that a new or changed cryptographic key generator associated with uncompromised firmware generated the secure cryptographic keys. The shared secret data may include a morphed value computed from immutable data, such as fuse data 210. A trusted application secret, with which the crypto-processor 208 verifies security of cryptographic key generation to the certifying entity, may be computed from this morphed value and various firmware data 212, such as a firmware version number and/or firmware measurements. Without the fuse data, malicious firmware cannot compute the trusted application secret and thus, cannot be verified by the certifying entity. When the firmware upgrades, the corresponding firmware data 212 and the trusted application secret also change. Using the upgraded firmware's version number, the certifying entity may verify the upgraded firmware running on the crypto-processor 208 and that firmware's capacity to generate secure cryptographic keys after determining whether the crypto-processor 208 is in possession of the changed trusted application secret as described herein.

The trusted application secret operates as a reference to and/or an alias of the shared secret data. Because the shared secret data is immutable, the firmware upgrade causes the trusted application secret to change, prompting recertification of any new cryptographic key. Alternatively, if the computing device 202 deleted the cryptographic keys or the certifying entity revoked certification of the cryptographic keys, recertification may be needed for new cryptographic keys.

Some example embodiments employ shared secret data known as a certification seed. The following illustrates an example expression for computing the certification seed:

Certification Seed:=Hash(fuse data∥vendor data)

Similar to the public identity value, the certification seed may be computed using the statistically-unique fuse data and/or the vendor data, such as a second vendor-defined string. In one example implementation, the certificate seed operates as a template for generating other values, including the trusted application secret, which may be known as a certification authorization value. The crypto-processor may use a deterministic function (e.g. a one-way hash function) to compute an appropriate certification authorization value. The following function represents one example implementation for computing an example value for the certificate authorization value:

Hash(Certification Seed||Firmware Measurement)

According to one example implementation, the certificate authorization value is configured to change in a predictable manner when the firmware in the crypto-processor changes resulting in a different firmware measurement. Secure and uncompromised firmware does not expose the shared secret and therefore, a certifying entity may assume that a specific certificate authorization value represents secure crypto-processor hardware running secure and uncompromised firmware. A compromise in the firmware results in a different certificate authorization value since the firmware itself cannot replicate a mechanism for computing the correct certificate authorization value.

According to some example implementations, the certification seed and/or the corresponding certificate authorization value represent shared and trusted data known only to the crypto-processor, manufacturer and/or certifying entity. As described herein, the certificate authorization value may be trusted by the certifying entity for referencing the certification seed during a session-based certification protocol. One example implementation of the certificate authorization value enables validation of the firmware running on the crypto-processor, for example, by verifying the firmware version and/or the endorsement seed's change.

After the crypto-processor 208 uses the certificate authorization value to verify to the certifying entity the security of a cryptographic key generator associated with the firmware, the entity may issue one or more commands instructing the crypto-processor 208 to generate cryptographic keys and begin using the cryptographic keys for secure data operations. By proving possession of the certificate authorization value, the crypto-processor 208 implicitly proves possession of the certification seed. In view of such proof, the entity may certify the cryptographic keys and/or issue certificates for proving possession of valid cryptographic keys.

One example mechanism for verifying the firmware's ability to generate secure cryptographic keys involves changing the cryptographic key generator. According to one example implementation, the certifying entity sends a command to change a cryptographic key generator referred to as a Endorsement Primary Seed (EPS) (e.g., an endorsement seed) from which an Endorsement Key (EK) (e.g., an endorsement key) is derived. This command is accompanied by a session audit request in which the certifying entity computes an HMAC value from the session secret and a hash digest of the command.

After the certifying entity determines that the command to change the endorsement seed has completed successfully, the certifying entity requests another session to generate a new endorsement key. The crypto-processor responds by using the new endorsement seed to generate the new endorsement key. If the endorsement key is created successfully, the other session will be validated at the certifying entity. If the computing device comprising the crypto-processor executes the command to generate the new endorsement key and provides valid session data matching the HMAC value, the other session concludes. The certifying entity proceeds to process a new certificate for the new endorsement key. If the certifying entity and the crypto-processor have different values of the certificate authorization value, the values of the session secrets also are different and the crypto-processor does not return a response to the certifying entity indicating that the command sequence completed successfully.

Once obtained, the crypto-processor 208 may bind the certificate 204 to the cryptographic keys according to one example implementation. When exported to the computing device 202, the operating system may use the key-certificate pairs to perform secure data operations with various software applications. It is appreciated that some example implementations permit cryptographic data exportation only to authorized computing devices, while other example implementations do not permit any exportation.

Figure 3:
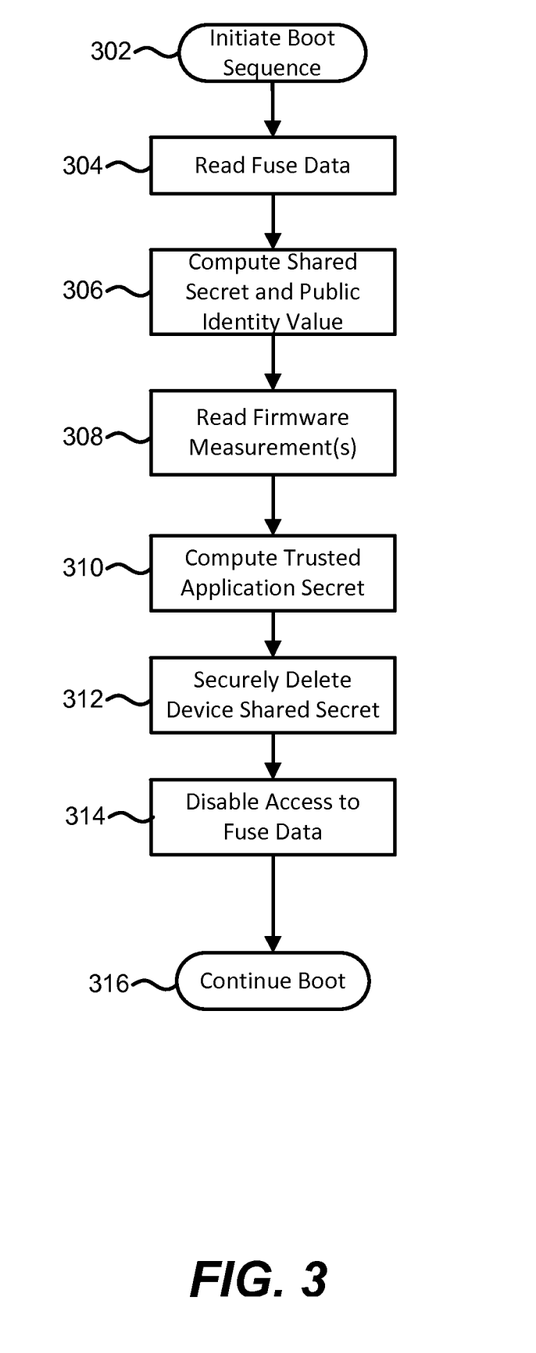
FIG. 3 is a flow diagram illustrating example steps for at least a portion of a boot sequence in a crypto-processor according to one or more example implementations.

FIG. 3 is a flow diagram illustrating example steps for at least a portion of a boot sequence in a crypto-processor according to one or more example implementations. One example implementation uses shared secret data to compute the trusted application secret data. One or more hardware/software components (e.g., the certification component 108 of FIG. 1) may be configured to perform at least some of the example steps. The example steps initiate the boot sequence at step 302 when a secure (computing) device using the crypto-processor is powered on, and proceeds to step 304 to continue the boot sequence.

Step 304 is directed to reading immutable fuse data stored within the crypto-processor. The fuse data includes statistically-unique private data that specifically identifies the crypto-processor's particular hardware and may be retrieved from programmable fuses or accessible via other, non-volatile storage. After the fuse data is read, access to the fuse data is completely disabled to prevent that data from being read again during or after the current boot sequence. Furthermore, the fuse data also may be used as an encryption key for some standard values, including vender-specific strings. The fuse data also includes immutable code that cannot be changed by a firmware update and may be executed on a CPU first before any other code in the crypto-processor.

Step 306 is directed to computing a shared secret and a public identity (ID) value from the fuse data. Because the public identity value is a hash value computed using the statistically-unique fuse data, when the crypto-processor is manufactured, the public identity value represents a specific instance or identity of the crypto-processor. The manufacturer records the public identity value to identify the crypto-processor's hardware during certification. If the public identity (ID) value is computed using vender data, such as a vender-defined string, the public identity value may also represent a particular vendor's crypto-processor hardware configuration. Hence, according to one example implementation, the public ID value may be computed as follows:

Public Identity Value:=Hash(fuse data||vendor data)

According to the following equation, the crypto-processors uses other vendor data, such as a second vendor-defined string, to compute one example of the shared secret:

Shared Secret:=Hash(fuse data||other vendor data)

Step 306 may compute other cryptographic keys/seeds in which each key/seed is configured for a particular application. Each seed value represents an example template or hierarchy for generating cryptographic keys.

As step 308 reads one or more firmware measurements, step 310 is directed towards using the firmware measurements and the shared secret to compute the trusted application secret, which identifies a particular combination of the crypto-processor hardware and the firmware operating the crypto-processor. This may be accomplished using a one-way function, such as a hash function, as exemplified by the following equation:

$$\text{Trusted Application Secret} := \text{Hash}(\text{Shared Secret} \| \text{Firmware Measurement})$$

Although the function labeled Hash( ) is used to illustrate one suitable method of deriving cryptographic seeds/keys, other pseudo-random functions, including encryption-related functions, may be used instead. Performing steps 312-314 may protect the shared secret and/or the fuse data from being manipulated by malicious entities. Step 312 refers to securely deleting the shared secret to prevent access and/or misappropriation by compromised firmware. Step 314 disables access to the fuse data, preventing such data from being exploited for falsifying credentials. Step 316 continues the boot sequence to complete the device startup.

Figure 4:
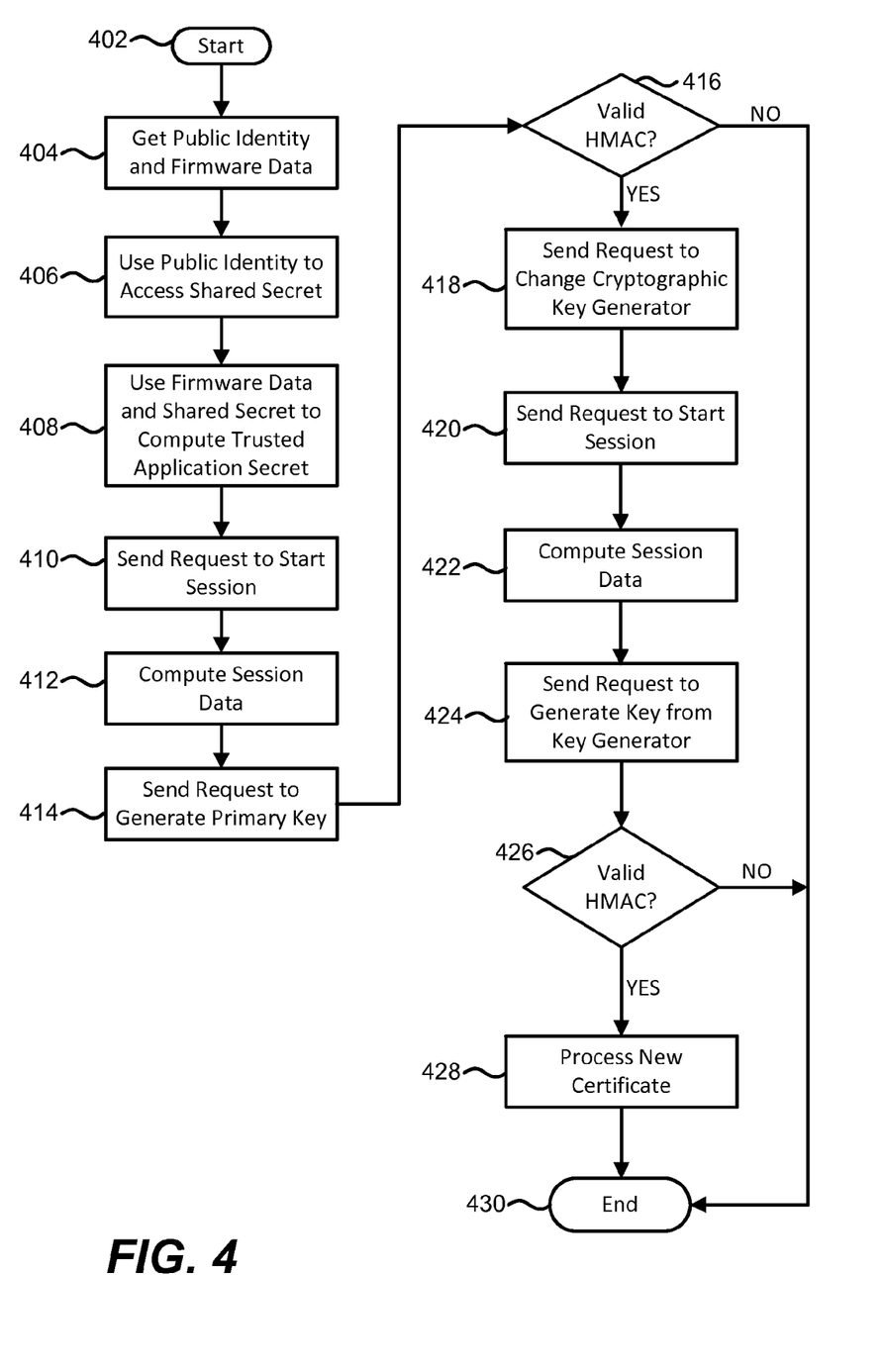
FIG. 4 is a flow diagram illustrating example steps for certifying a crypto-processor using shared secret data according to one or more example implementations.

FIG. 4 is a flow diagram illustrating example steps for certifying cryptographic data in a crypto-processor according to one or more example implementations. One example implementation certifies new cryptographic data, including a new cryptographic key generator and/or new cryptographic primary keys generated from the new cryptographic key generator, for securing data operations by the crypto-processor. One or more hardware/software components within a certifying entity (e.g., the certifying entity 104 of FIG. 1) may be configured to perform at least some of the example steps.

The example steps commence at step 402 and proceed to step 404 at which a public identity (ID) and firmware data (e.g., a firmware version number) is received from a device comprising the crypto-processor. As described herein, the public identity maps to the crypto-processor and enables the certifying entity to search a secure data store to access a corresponding shared secret at step 406 and compute a trusted application secret at step 408 using the shared secret and the firmware data. The trusted application secret may unambiguously represent a specific combination of the crypto-processor and the firmware and therefore, may be used as a trusted reference to that combination when the crypto-processor and the certifying entity engage in an example certification process. Note that the trusted application secret is not communicated to the certifying entity to avoid unintentionally disclosing such data.

Some example embodiments execute the example certification process following the generation of the cryptographic key, for example, from a cryptographic key generator stored in new/upgraded firmware. The example certification process may employ a session-based protocol to audit commands for generating the cryptographic keys. Step 410 is directed towards starting a session by communicating a request to the crypto-processor from the certifying entity. Step 412 computes session data, including a session secret, based upon the shared secret and/or other data. When the certifying entity requests the session, according to one example implementation, the crypto-processor returns response data as at least a portion of the other data for generating the session secret.

Step 414 refers to requesting a new cryptographic key from the crypto-processor. The new cryptographic key generated by the crypto-processor is based on a cryptographic key generator that is not stored nor exported outside of the crypto-processor. As described herein, the cryptographic key generator operates as a template for producing a hierarchy of cryptographic keys. When the cryptographic key generator changes, a new template is used and each subsequent new cryptographic key is not in the same hierarchy of keys as another key generated with a previous cryptographic key generator. Hence, the new cryptographic key may be completely different (e.g., mathematically) from the other older key. If the previous cryptographic key generator was used when the crypto-processor was running compromised firmware, that generator's older keys also may be compromised. When the cryptographic key generator is changed, the compromised cryptographic keys cannot be recertified because the crypto-processor will no longer be able to create them.

After successfully generating the new cryptographic key from the new cryptographic key generator, the crypto-processor notifies the certifying entity, which verifies that the cryptographic key generation being performed at the crypto-processor is secure. As described herein, an HMAC value may be used during the session-based protocol to effectuate the verification and complete the example certification process. The crypto-processor may return the HMAC value with the new cryptographic key. The certifying entity uses the public identity value and the firmware version number to access a secure data store and retrieve a shared secret associated with the crypto-processor and firmware measurements associated with the firmware version number. The certifying entity computes a session secret from the shared secret and other session data (e.g., session request/response data). By computing the HMAC value from the session secret, the certifying entity allows the crypto-processor to authenticate the cryptographic key's generation from upgraded/reliable firmware.

Step 416 is a determination as to whether the HMAC value is valid. To illustrate by way of example, an appropriate HMAC function generates a valid HMAC value from a valid session secret corresponding to the shared secret between the certifying entity and the crypto-processor. If the HMAC value is deemed valid (e.g., the HMAC value matches the HMAC value from the crypto-processor), step 416 proceeds to step 418; however, if step 416 declares the HMAC to be invalid, step 418 to step 428 are omitted and step 430 terminates the example steps depicted in FIG. 4.

Step 418 requests a change to the cryptographic key generator. The certifying entity sends a request that the firmware running within the crypto-processor produce a new cryptographic key generator. After receiving an indication of a successful cryptographic key generator change, step 420 requests a session to generate a new cryptographic key from the new cryptographic key generator. As described herein, the crypto-processor, in response to the certifying entity's request, compute separate copies of session data, including a session secret based on one or more nonces in the response and the trusted application secret. Note that one example use of a nonce in a session is to prevent the session data from being reused. Step 422 is directed towards the certifying entity computing appropriate session data, including a copy of the session secret, for validating the new cryptographic key generator change.

Step 424 sends a request to generate the new cryptographic key and audits execution of this request using the session secret. The crypto-processor computes an HMAC value using that crypto-processor's copy of the shared secret. Step 426 determines whether the HMAC is a valid HMAC. The session secret operates as a mechanism through which the crypto-processor may validate the HMAC value. If the certifying entity and the crypto-processor have different values of the shared secret, the values of the session secret also are different. As a result, the crypto-processor does not return a response to the certifying entity indicating that the command sequence completed successfully, or alternatively, returns a response indicating that the command sequence failed. If the crypto-processor executes the command to change the primary key generator and provides the certifying entity with valid authentication data matching the certifying entity's copy of the HMAC value, the audit session concludes. Because the sequence of commands completes successfully within the session, the certifying entity may verify that the crypto-processor associated with the public identity value generated the new cryptographic key with a cryptographic key generator that was changed (e.g., after a firmware update).

If the firmware used by the crypto-processor differs in some way from a firmware version assumed by the certifying entity, the session secrets used by the certifying entity and the crypto-processor may not match and the command sequence fails. If the certifying entity and the crypto-processor have different values of the trusted application secret, the values of the session secrets also are different and the crypto-processor does not return a response to the certifying entity indicating that the command sequence completed successfully. When new firmware is installed on the crypto-processor, the crypto-processor is rebooted and the certification component produces the shared secret, the public identity (ID) value, and/or other keys/seeds. The trusted application secret differs from a previous trusted application secret because the firmware in the crypto-processor has been updated. If the HMAC's validity cannot be certified, step 426 proceeds to step 430 where the example steps of FIG. 4 terminate. If the HMAC is determined to be valid, the certifying entity issues a new certificate proving the new cryptographic key's authenticity at step 428. Step 430 terminates the example steps depicted in FIG. 4.

It is appreciated that the certifying entity may not perform both of above described sessions in a same procedure. According to at least one alternative implementation, if the certifying entity validates the change to the cryptographic key generator, the cryptographic key may be generated at any later point in time regardless of duration.

Figure 5:
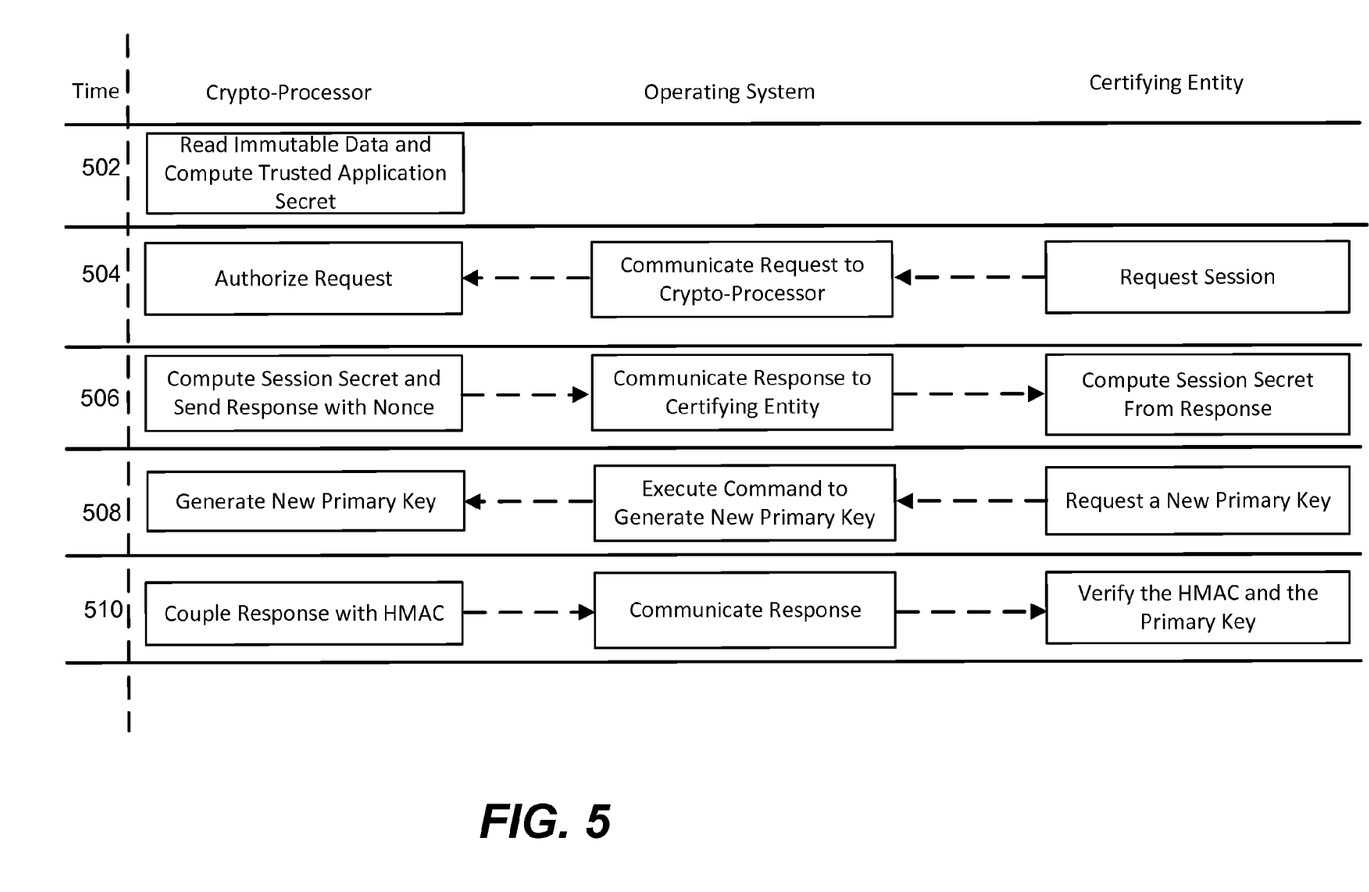
FIG. 5 is a sequence diagram illustrating an example certification process according to one or more example implementations.

FIG. 5 is a sequence diagram illustrating an example certification process according to one or more example implementations. FIG. 5 depicts various interactions between a crypto-processor, an operating system running on a computing device and a certifying entity at different times in the example certification process. Prior to initiating the example certification process, one or more hardware/software components, at time 502, prepare the crypto-processor for (potential) certification, for example, by booting up the crypto-processor, reading immutable data (e.g., fuse data), generating a shared secret from the immutable data, and computing a trusted application secret. Upon completion of time 502, the crypto-processor is configured for secure data operations and new cryptographic key generation. Example cryptographic keys may be referred to below as primary keys.

Time 504 includes a session between the crypto-processor and the certificate entity. Generally, the certifying entity requests such a session (e.g., an authorization session) in order to engage in secure communications with the crypto-processor and/or to access primary keys. The certifying entity may augment the session with an audit of new primary key generation according to one or more example implementations. During this session, the crypto-processor sends a public identity (ID) value and firmware version number. The certifying entity uses the public identity value and the firmware version number to retrieve the crypto-processor's shared secret and measurements associated with the firmware version number, respectively, from a secure data store.

At time 504, the operating system communicates the request to the crypto-processor and responds to the certifying entity with an acknowledgment if the crypto-processor successfully authorized the request. As described herein, the certifying entity may compute an HMAC value (e.g., an authorization HMAC) using a secure copy of the shared secret. An example request, communicated with the HMAC value, authorizing a new primary key for the certifying entity may be validated using the crypto-processor's copy of the trusted application secret. When the crypto-processor confirms that the HMAC value was computed from the correct trusted application secret.

At time 506, the crypto-processor within the computing device computes a session secret based upon a nonce in the request, another nonce and the trusted application secret. The crypto-processor may send a response with an HMAC (e.g., an audit HMAC) of the session secret and the other nonce. In turn, the certifying entity validates the HMAC using a copy of the session secret that is computed from the certifying entity's copy of the trusted application secret, the nonce and the other nonce in the response. This allows the certifying entity to verify the crypto-processor's identity as represented by the crypto-processor's hardware and firmware combination.

When the certifying entity at time 508 communicates a command requesting a new primary key, the operating system uses the crypto-processor to validate the command with an HMAC value, thereby verifying the crypto-processor's authenticity to the certifying entity. After generating the new primary key, the HMAC value is coupled to that key and communicated to the certifying entity in a response at time 510. If the crypto-processor uses a correct shared secret to compute a copy of the trusted application secret, the certifying entity may verify the crypto-processor's possession of the correct shared secret by comparing the command's HMAC value with an HMAC value computed from the certifying entity's copy of the session secret. If these HMAC values match, the crypto-processor generates the primary key, as instructed by the certifying entity. The operating system returns an acknowledgment of the new primary key. If the HMAC values do not match, the crypto-processor instructs the operating system not to return any information to the certifying entity.

During time 508 and time 510, the certifying entity and computing device engage in a session audit of the command instructing the crypto-processor to generate the primary key according to one or more example implementations. In order to complete the session, the crypto-processor generates a response with a public portion of the primary key if the HMAC values match at time 510. Receiving the response at the certifying entity verifies that the primary key generator and/or the firmware is secure and uncompromised, for example, if the primary key's public portion is computable from the primary key generator's hierarchy or template. As one alternative, if the primary key's public portion falls into a different cryptographic key hierarchy from a previous primary key generated by the crypto-processor, the certifying entity verifies that the crypto-processor changed the primary key generator and/or issues a new certificate for the primary key. If the HMAC values do not match at time 510, the session audit fails and no response is sent to the certifying entity.

Figure 6:
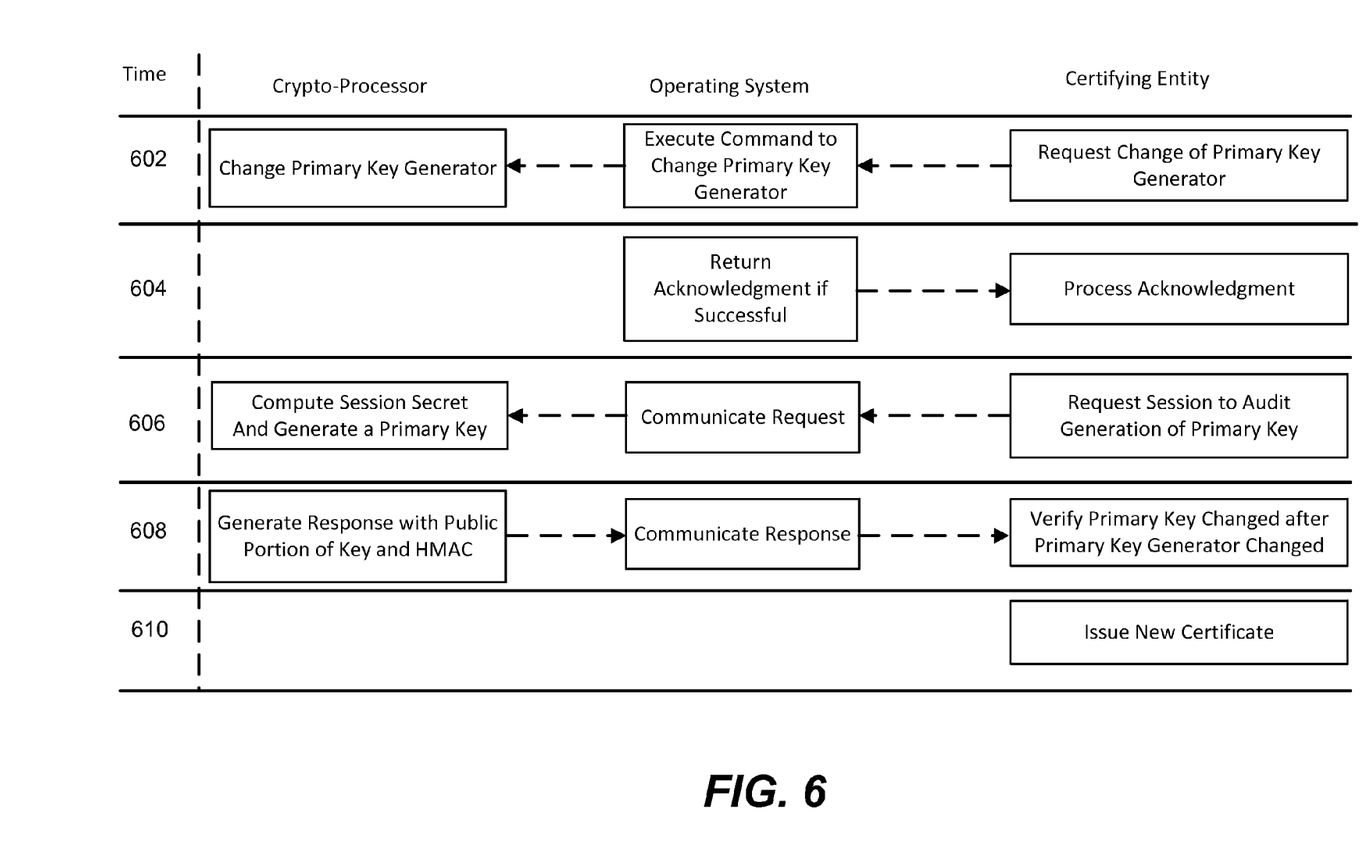
FIG. 6 is a sequence diagram illustrating an example certification process after a firmware upgrade according to one or more example implementations.

FIG. 6 is a sequence diagram illustrating an example certification process after a firmware upgrade according to one or more example implementations. FIG. 6 depicts various interactions between a crypto-processor, an operating system running on a computing device and a certifying entity at different times in the example certification process. Prior to initiating the example certification process, one or more hardware/ software components prepare the crypto-processor for certification, for example, by communicating a firmware version number, a public identity and/or a primary key to the certifying entity. As described herein, the primary key generator corresponds to a cryptographic group or template for generating new cryptographic keys. Because primary keys generated from different templates are not mathematically related to each other, when the firmware running on the crypto-processor is upgraded, the certifying entity anticipates receiving a completely different primary key and deducing a change in cryptographic key generation at the crypto-processor. The certifying entity and the crypto-processor undergo the example certification process to re-certify the crypto-processor's hardware and firmware combination.

The example certification process commences at time 602 when the certifying entity requests a change to a primary key generator that produced the primary key. An operating system, in turn, issues to the crypto-processor a command to change the primary key generator. If the crypto-processor executes the command successfully, the operating system returns an acknowledgment to the certifying entity at time 604. The acknowledgment indicates the primary key generator changed successfully. The operating system functions as an intermediary between the certifying entity and the crypto-processor by passing the request to the crypto-processor to start the session.

At time 606, the certifying entity requests a session with the crypto-processor and during this session, the certifying entity audits a command to generate a new primary key. In order to validate changes to cryptographic key generation caused by a firmware upgrade and/or an unknown primary key generator, the crypto-processor and the certifying entity initiate the session according to one or more example implementations. For example, after the certifying entity requests a public portion of the new primary key, the crypto-processor also may send a public identity (ID) value and firmware version number. The certifying entity uses the public identity value and the firmware version number to access a secure data store and retrieve the crypto-processor's shared secret and firmware measurements associated with the firmware version number.

In response to the certifying entity's request, the crypto-processor may generate a response including the new primary key's public portion and an HMAC value for verifying the security of the new primary key's generation during time 608. By authenticating the HMAC value from the crypto-processor using a corresponding HMAC value computed from the session secret, the certifying entity may verify that the new primary key was generated after the primary key generator changed. If the public portion of the new primary key does not match a corresponding public portion of a primary key (e.g., the previous primary key) stored at the certifying entity, the example certification process may be concluded because the primary key generator changed as directed. Note, the public portions of the new primary key and the previous primary key may not match if each primary key is generated from a different hierarchy or template.

If the public portion of the new primary key does match the corresponding public portion of the primary key, the primary key generator did not change as directed indicating that the firmware running on the crypto-processor may be compromised. As an alternative, if the HMAC values do not match, the crypto-processor instructs the operating system not to return any information to the certifying entity. After a period of time elapses without a response from the crypto-processor, the certifying entity may assume that the primary key generator did not change during time 602.

Because of the HMAC session that the certifying entity attached to the command for generating the primary key, the certifying entity was able to develop a trust relationship with the crypto-processor. If the certifying entity determines that the response is valid, indicating that the response came from a device in possession of the session secret, the certifying entity concludes the audit session and issues a new certificate at time 610.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
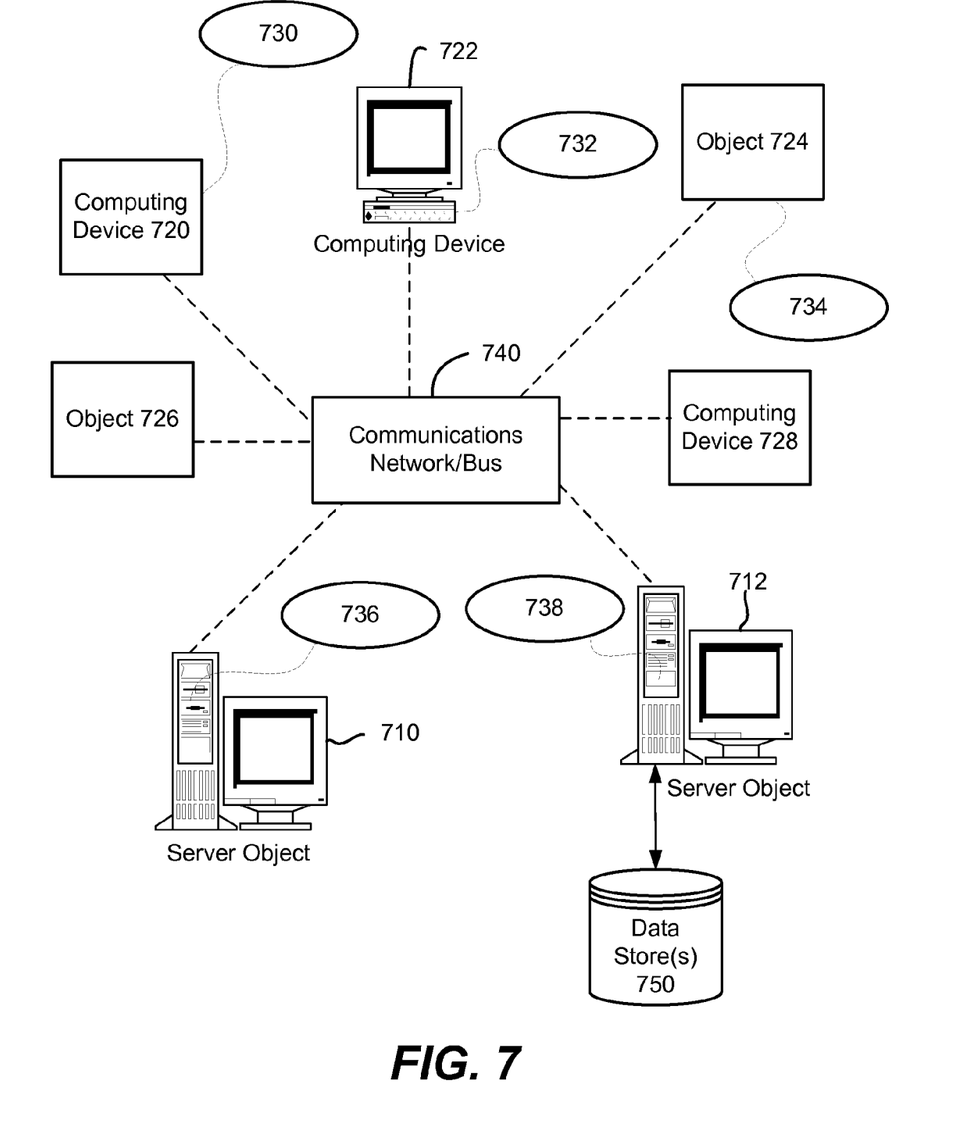
FIG. 7 is a block diagram representing example non-limiting networked environments in which various embodiments described herein can be implemented.

FIG. 7 provides a schematic diagram of an example networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as crypto-processors, personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances. Computing object 712, for example, acting as a server provides client computing objects or devices 720, 722, 724, 726, 728, etc. with access to storage resources within data store(s) 760.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
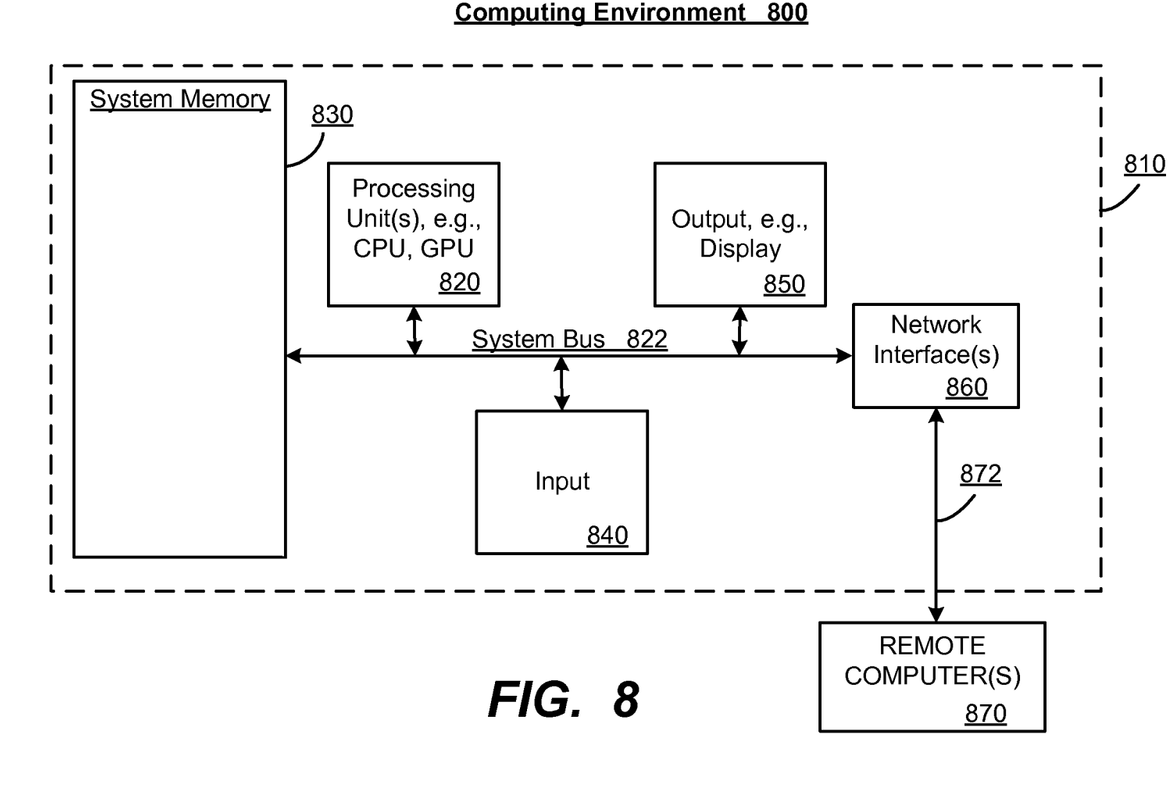
FIG. 8 is a block diagram representing an example non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the example computing system environment 800.

With reference to FIG. 8, an example remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. Alternatively, the remote computer 870 comprises a crypto-processor for performing secure data operations. The logical connections depicted in FIG. 8 include a network 842, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method for managing cryptographic data certification of
   a crypto-processor, the method comprising:
      computing shared secret data from data corresponding to hardware within the crypto-graphic processor;
      generating trusted application secret data based upon a certification seed, firmware data, and from the shared secret data between the crypto-processor and a certifying entity, the trusted application secret data identifying a combination of hardware corresponding to the crypto-processor and firmware running with the crypto-processor;
      upon generating the trusted application secret data, deleting or disabling access to the shared secret data within the crypto-processor;
      sending the trusted application secret data to the certifying entity to verify cryptographic key generation by the crypto-processor; and
      if the cryptographic key is verified, receiving, from the certifying entity, an indication that the trusted application secret data matches second trusted application secret data generated by the certifying entity from second shared secret data that corresponds to the shared secret data; and
      if the cryptographic key is not verified, receiving, from the certifying entity, an indication that the trusted application secret data does not match the second trusted application secret data generated by the certifying entity from the second shared secret data that corresponds to the shared secret data.

2. The method of claim 1 further comprising processing a certificate for proving validity of new cryptographic data.

3. The method of claim 1 further comprising generating a cryptographic key generator, and generating cryptographic keys using the cryptographic key generator.

4. The method of claim 1 further comprising computing the shared secret data using a one-way mathematical function and immutable data corresponding to the hardware within the crypto-processor.

5. The method of claim 1, wherein using the trusted application secret data further comprises verifying new cryptographic data after a firmware upgrade.

6. The method of claim 1, further comprising:
changing a cryptographic key generator into a new cryptographic generator; and
verifying the new cryptographic key generator to the certifying entity.

7. In a computing environment, a system, comprising:
a crypto-processor configured to provide secure data operations using at least one cryptographic key, the crypto-processor:
generating trusted application secret data based upon a certification seed, firmware data, and using firmware data of the crypto-processor and shared secret data computed from data corresponding to hardware within the crypto-graphic processor; and
deleting the shared secret data upon generating the trusted application secret data; and
a certification component coupled to the crypto-processor, the certification component:
computing second trusted application secret data from second shared secret data corresponding to firmware stored within the crypto-processor prior to the deleting of the shared secret data;
verifying the firmware of the crypto-processor to a certifying entity by comparing the trusted application secret data with the second trusted application secret data; and
upon verification of the firmware, processing a certificate proving validity of the at least one cryptographic key.

8. The system of claim 7, wherein the certification component further changes a cryptographic key generator corresponding to the firmware.

9. The system of claim 8, wherein the certification component further engages in a session with the certifying entity for using a new cryptographic key generator to generate a new cryptographic key.

10. The system of claim 9, wherein the certification component further compares the new cryptographic key generator to a previous cryptographic key generator associated with the crypto-processor.

11. The system of claim 7 further comprising a computing device that executes the certification component during a boot sequence.

12. The system of claim 7, wherein the certification component further computes a session secret using the trusted application secret data.

13. The system of claim 12, wherein the certification component further produces a hash based message authentication (HMAC) value for a session using the session secret.

14. The system of claim 13, wherein the certification component further uses the HMAC value to validate a command, communicated by the certifying entity, for generating a new cryptographic key.

15. One or more computer-readable storage media having computer-executable instructions, which when executed perform operations comprising:
accessing shared secret data associated with a crypto-processor in response to a change in cryptographic key generation at the crypto-processor;
generating session data based upon a certification seed, firmware data, and the shared secret data between the crypto-processor and a certifying entity, the trusted application secret data identifying a combination of hardware corresponding to the crypto-processor and firmware running with the crypto-processor, the session data corresponding to verifying a cryptographic key generator at the crypto-processor;
upon generating the trusted application secret data, deleting or disabling access to the shared secret data within the crypto-processor;
sending the trusted application secret data to the certifying entity to verify cryptographic key generation by the crypto-processor; and
if the cryptographic key is verified, receiving, from the certifying entity, an indication that the trusted application secret data matches second trusted application secret data generated by the certifying entity from second shared secret data that corresponds to the shared secret data; and
if the cryptographic key is not verified, receiving, from the certifying entity, an indication that the trusted application secret data does not match the second trusted application secret data generated by the certifying entity from the second shared secret data that corresponds to the shared secret data.

16. The one or more computer-readable storage media of claim 15 having further computer-executable instructions, which when executed perform an operation comprising:
communicating the session data to the crypto-processor, including a request to generate new cryptographic data for performing secure computations; and
issuing a certificate for the new cryptographic data in response to a change to a cryptographic key as a result of a change in a cryptographic key generator.

17. The one or more computer-readable storage media of claim 15 having further computer-executable instructions, which when executed perform an operation comprising:
comparing an HMAC value communicated by the crypto-processor with an HMAC value computed from a session secret to determine whether the crypto-processor is in possession of the shared secret data.

18. The method of claim 1, wherein the data corresponding to hardware within the crypto-graphic processor is fuse data.

19. The method of claim 1, wherein the deleting or disabling of access to the shared secret data within the crypto-processor is executed prior to running firmware.

* * * * *